(12) United States Patent
Park

(10) Patent No.: US 8,972,322 B2
(45) Date of Patent: Mar. 3, 2015

(54) APPARATUS AND METHOD FOR EXTENDING A DEFAULT MODEL OF A TERMINAL

(75) Inventor: Sang-do Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 329 days.

(21) Appl. No.: 13/406,916

(22) Filed: Feb. 28, 2012

(65) Prior Publication Data

US 2013/0144823 A1 Jun. 6, 2013

(30) Foreign Application Priority Data

Dec. 2, 2011 (KR) ........................ 10-2011-0128592

(51) Int. Cl.
*G06F 17/00* (2006.01)
*G06N 5/02* (2006.01)

(52) U.S. Cl.
USPC ............................................................ 706/46

(58) Field of Classification Search
CPC ............................ G06N 5/02; G06N 17/30557
See application file for complete search history.

(56) References Cited

U.S. PATENT DOCUMENTS

| 2004/0034651 A1* | 2/2004 | Gupta et al. ................. 707/102 |
| 2010/0211533 A1* | 8/2010 | Yang et al. ..................... 706/12 |
| 2010/0217764 A1 | 8/2010 | Labrou et al. |

FOREIGN PATENT DOCUMENTS

| KR | 10-0643704 B1 | 11/2006 |
| KR | 10-2007-0009134 A | 1/2007 |
| KR | 10-2010-0032071 A | 3/2010 |

OTHER PUBLICATIONS

Tecuci et al. "Teaching Intelligence Analysis With Tiacritis", American Intelligence Journal, vol. 28, No. 2, 2010, pp. 24.*

* cited by examiner

*Primary Examiner* — Li-Wu Chang
(74) *Attorney, Agent, or Firm* — NSIP Law

(57) ABSTRACT

Provided are an apparatus and method for adding a variety of concepts to a default model by combining a linked model with the default model and linked data that is to be matched with the linked model. The apparatus may generate first relationship information about a relationship between a concept included in the default model and a concept included in the linked model and second relationship information about a relationship between a concept included in the linked model and a concept included in the linked data. The apparatus may combine the default model, the linked model, and the linked data, based on the first and second relationship information.

18 Claims, 6 Drawing Sheets

FIG. 3

| SIMILARITY | UPPER-LOWER RELATIONSHIP | ... |
|---|---|---|
| CONCEPTS A, A`, A`` ARE IDENTICAL | C IS LOWER CONCEPT OF D | |
| CONCEPTS B, B`, B`` ARE IDENTICAL | E IS LOWER CONCEPT OF F | |
| ⋮ | ⋮ | |

310 — SIMILARITY
320 — UPPER-LOWER RELATIONSHIP

EXTENDED DEFAULT MODEL

APPARATUS AND METHOD FOR EXTENDING A DEFAULT MODEL OF A TERMINAL

CROSS-REFERENCE TO RELATED APPLICATION(S)

This application claims the benefit under 35 U.S.C. §119(a) of Korean Patent Application No. 10-2011-0128592, filed on Dec. 2, 2011, in the Korean Intellectual Property Office, the entire disclosure of which is incorporated herein by reference for all purposes.

BACKGROUND

1. Field

The following description relates to a technology for extending a default model stored in a terminal by use of another model or data.

2. Description of the Related Art

Situation awareness involves being aware of what is happening or what is going to happen in a nearby vicinity to understand how information, events, and one's own actions will impact goals and objectives, both immediately and in the near future. A reasoning or inference engine may use situation awareness technology.

Situation-awareness technology in use of a reasoning engine may utilize a model for context reasoning. For example, a typical type of model is an ontology. A result of reasoning may be dependent on how specifically a model for a reasoning engine is defined. Accordingly, the use of a more specified model may yield a more accurate reasoning result. In an effort to achieve this, more attention has been paid to a situation-awareness technology that focuses on a specific domain.

Recently released terminals, such as smart phones, offer situation-awareness services for a variety of domains, not just for a specific domain. To provide the situation-awareness service for a variety of domains, different models suitable to each domain are required. For example, if a user is at the 'theater,' a 'theater' model is required to recognize a situation related to the 'theater,' As another example, if the user is meeting a 'friend,' a 'friend' model is required to recognize a situation related to a 'friend.' However, it is very difficult for a terminal to create, store, provide, and manage a variety of models for each respective domain.

SUMMARY

In one general aspect, there is provided an apparatus for extending a default model for user context reasoning, the apparatus including a first generating unit configured to generate first relationship information about a relationship between a concept included in the default model and a concept included in a linked model by matching the concept of the default model with the concept of the linked model, a second generating unit configured to generate second relationship information about a relationship between a concept included in the linked model and a concept included in linked data by matching the concept of the linked model with the concept of the linked data, and a combining unit configured to combine the default model and the linked model based on the first relationship information, and to combine the linked model and the linked data based on the second relationship information.

The first generating unit may be configured to match the concept included in the default model with the concept included in the linked model based on concept relationship information that defines a relationship between concepts.

The second generating unit may be configured to match the concept included in the linked model with the concept included in the linked data based on concept relationship information that defines a relationship between concepts.

The concept relationship information may include at least one of information about identical concepts, information about similar concepts, and information about upper and lower concepts.

The first generating unit may be further configured to extract identical concepts from concepts included in the default model and the linked model using at least one of string matching, structure matching, upper-level ontology-based semantic matching, and WordNet-based matching, and to generate the first relationship information that indicates that the extracted concepts are identical.

The second generating unit may be further configured to extract identical concepts from concepts included in the linked model and the linked data using at least one of string matching, structure matching, upper-level ontology-based semantic matching, and WordNet-based matching, and to generate the second relationship information that indicates that the extracted concepts are identical.

The first relationship information and the second relationship information may include at least one of identity information, similarity information, and hierarchy information.

The apparatus may further comprise an internal memory located inside of the apparatus and configured to store the default model, a first external memory located outside of the apparatus and configured to store the linked data, and a second external memory located outside of the apparatus and configured to store the linked data.

In another aspect, there is provided a method for extending a default model for user context reasoning, the method including generating first relationship information about a relationship between a concept included in the default model and a concept included in a linked model by matching the concept of the default model with the concept of the linked model, generating second relationship information about a relationship between a concept included in the linked model and a concept included in linked data by matching the concept of the linked model with the concept of the linked data, combining the default model and the linked model based on the first relationship information, and combining the linked model and the linked data based on the second relationship information.

The generating of the first relationship information may comprise matching the concept included in the default model with the concept included in the linked model based on concept relationship information that defines a relationship between concepts.

The generating of the second relationship information may comprise matching the concept included in the linked model with the concept included in the linked data based on concept relationship information that defines a relationship between concepts.

The concept relationship information may include at least one of information about identical concepts, information about similar concepts, and information about upper and lower concepts.

The generating of the first relationship information may comprise extracting identical concepts from concepts included in the default model and the linked model using at least one of string matching, structure matching, upper-level ontology-based semantic matching, and WordNet-based matching, and generating the first relationship information that indicates that the extracted concepts are identical.

The generating of the second relationship information may comprise extracting identical concepts from concepts included in the linked model and the linked data using at least one of string matching, structure matching, upper-level ontology-based semantic matching, and WordNet-based matching, and generating the second relationship information that indicates that the extracted concepts are identical.

The first relationship information and the second relationship information may include at least one of identity information, similarity information, and hierarchy information.

In another aspect, there is provided a computer-readable storage medium having stored therein program instructions to cause a processor to execute a method for extending a default model associated with user context, the method including generating first relationship information about a relationship between a concept included in the default model and a concept included in a linked model by matching the concept of the default model with the concept of the linked model, generating second relationship information about a relationship between a concept included in the linked model and a concept included in linked data by matching the concept of the linked model with the concept of the linked data, combining the default model and the linked model based on the first relationship information, and combining the linked model and the linked data based on the second relationship information.

In another aspect, there is provided an apparatus for extending a model used for context reasoning, the apparatus including a generating unit configured to generate relationship information about a relationship between one or more concepts included in the model and one or more concepts included in a linked model by matching the one or more concepts of the model with the one or more concepts of the linked model, and a combining unit configured to extend the model by combining the model and the linked model based on the relationship information.

The generating unit may be configured to identify a concept included in the model that is identical to a concept included in the linked model based on the matching, and to generate relationship information indicating the concept included in the model is identical to the concept included in the linked model.

The generating unit may be configured to identify a concept included in the model that is similar but not identical to a concept included in the linked model based on the matching, and to generate relationship information indicating the concept included in the model is similar to the concept included in the linked model.

The apparatus may further comprise a second generating unit configured to generate second relationship information about a relationship between one or more concepts included in the linked model and one or more concepts included in linked data by matching the one or more concepts of the linked model with the one or more concepts of the linked data, and the combining unit may be further configured to extend the model by combining the model and the linked data based on the relationship information and the second relationship information.

Other features and aspects may be apparent from the following detailed description, the drawings, and the claims.

BRIEF DESCRIPTION OF THE DRAWINGS

FIG. 3 is a diagram illustrating an example of concept relationship information.

Figure 1:
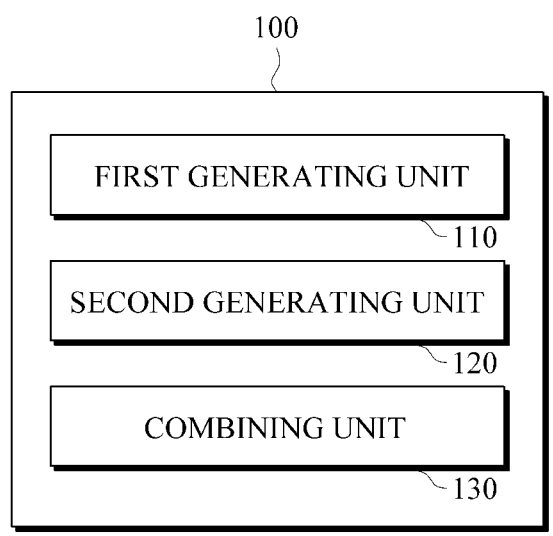
FIG. 1 is a diagram illustrating an example of an apparatus for extending a default model.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 illustrates an example of an apparatus for extending a default model. The default model may be a model used by a terminal. The term "default" as used herein is not meant to limit the type of model that may be extended. It should be understood that a model used for context reasoning may be extended by the examples described herein.

Referring to FIG. 1, apparatus 100 includes a first generating unit 110, a second generating unit 120, and a combining unit 130.

The apparatus 100 may be included in a terminal. The terminal may include, for example, a mobile phone, a smartphone, a notebook computer, a digital broadcast terminal, a personal digital assistant (PDA), a portable multimedia player (PMP), a navigation system, a tablet, and the like. The terminal may store and execute a context aware application.

The terminal may include a model, for example, a default model that is associated with user context information and that, for example, may be initially installed in the terminal, may be downloaded and/or installed by a user of the terminal after purchase, and the like. The first generating unit 110 may generate first relationship information about a relationship between a concept included in the default model with a concept included in a linked model by matching the concept of the default model and the concept of the linked model.

For example, the user context information may indicate information about a user, for example, a user's current location, records of who a user calls, text messages which the user has sent and received, contents of emails, a user's propensity to consume, and the like. The user context information may be extracted from a device that can store or transmit and/or receive the user context information. For example, the user context information may be extracted from a position tracking device, an email server, a communication server, a terminal device, a sensor, and the like.

Each model may include a variety of concepts to represent a specific domain. The concepts may be related to one another semantically. The concepts may be referred to as classes.

As described herein, a default model may be a model that has been initially stored in a terminal by a manufacture and which may or may not have been updated. As another example, the default model may be installed subsequent to manufacture, for example, by a user of the terminal. The default model may include concepts that are generally of a higher level, such as locations, time, and companions. A manufacturer may publicize their default models.

The linked model may be used to extend the default model. For example, the linked model may be stored in an internal memory of the terminal or an external memory. In addition, the linked model may be coupled to both the default model and linked data. For example, the internal memory and the external memory may include one or more storage media, for example, a flash memory, a hard disk, a multimedia card micro type memories (for example, SD or XD memory), a RAM, a ROM, web storage, and the like. Because the linked model can be added continuously by a user or an update device, it may have more variety of forms than the default model.

For example, the linked data may be generated by specifying relationships between raw data. The linked data may contain a concept and fact information for use in describing a specific domain. The linked data may be stored in an external memory of a terminal.

The first relationship information may include information about a relationship between the concept included in the default model and the concept included in the linked model. For example, the first relationship information may include identity information, similarity information, hierarchy information, and the like. In addition, the first relationship information may include various forms of relationship information that defines a relationship between concepts.

The first generating unit 110 may match a concept included in the default model and a concept included in the linked model based on concept relationship information that defines a relationship between the concepts. For example, the concept relationship information may include information about identical concepts, information about similar concepts, information about upper and lower concepts, and the like. In addition, the concept relationship information may further include information about concepts in a specific relationship. For example, the concept relationship information may be information indicating that "Concept A and Concept A' have similarity." An example of the concept relationship information is described with reference to FIG. 3.

For example, the first generating unit 110 may extract the identical concepts from concepts included in the default model and the linked model by use of string matching, structure matching, upper-level ontology-based semantic matching, WordNet-based matching, and the like. The string matching may determine whether concepts are the same by comparing strings of words that correspond to concepts. The structure matching may determine whether concepts are the same based on information about class ('concept') and properties of the class.

The upper-level ontology-based semantic matching may determine a relationship between concepts by utilizing a third ontology that defines an upper concept with respect to the default model and the linked model. The WordNet-based matching is similar to the upper-level ontology-based semantic matching in terms of utilization of a third ontology, however, it determines a relationship between concepts based on a definition of identical concepts.

The first generating unit 110 may generate the first relationship information that indicates that the extracted concepts are the same. An example of a concept relationship is described with reference to FIG. 3.

The second generating unit 120 may generate second relationship information by matching the concept included in the linked model with the concept included in the linked data. For example, the second relationship information may include relationship information about a relationship between the concept included in the linked model and the concept included in the linked data. For example, the second relationship information may include identity information, similarity information, hierarchy information, and the like. In addition to the relationship information, the second relationship information may include a variety of relationship information that defines a relationship between concepts.

The second generating unit 120 may match the concept included in the linked model and the concept included in the linked data based on the concept relationship information that defines a relationship between concepts. For example, the second generating unit 120 may extract identical concepts from concepts included in the linked model and the linked data by use of string matching, structure matching, an upper-level ontology-based semantic matching, WordNet-based matching, and the like. The second generating unit 120 may generate the second relationship information that indicates that the extracted concepts are the same.

The combining unit 130 may combine the default model and the linked model based on the first relationship information. Also, the combining unit 130 may combine the linked model and the linked data based on the second relationship information.

For example, the first relationship information may indicate that concept A included in the default model is an upper/lower concept of concept B included in the linked model. In this example, the combining unit 130 may combine the default model and the linked model in such a manner that concept A in the default model can be an upper/lower concept of concept B in the linked model.

The apparatus shown in the example illustrated in FIG. 1 may combine the linked model, which is matched with the default model, and the linked data, which is matched with the linked model, with the default model. Accordingly, more variety of concepts can be added to the default model in comparison to a case of simply combining the linked data with the default model. As a result, a reasoning device may perform more accurate reasoning based on the extended default model that includes a diversity of concepts.

Figure 2:
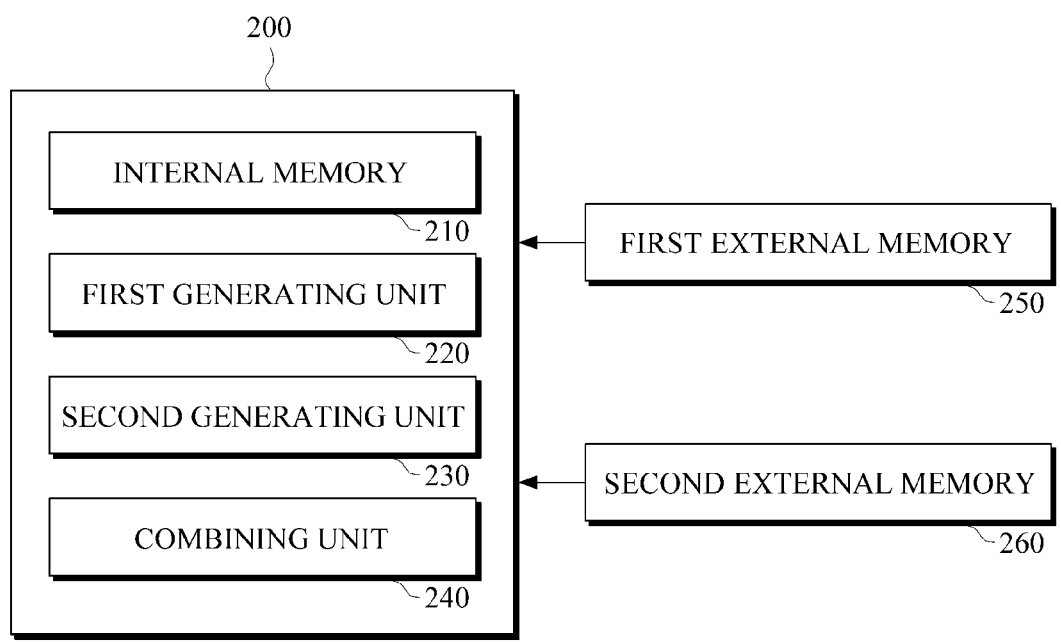
FIG. 2 is a diagram illustrating another example of an apparatus for extending a default model.

FIG. 2 illustrates another example of an apparatus for extending a default model.

Referring to FIG. 2, apparatus 200 includes an internal memory 210, a first generating unit 220, a second generating unit 230, a combining unit 240, a first external memory 250, and a second external memory 260.

As an example, the internal memory 210 may be located inside of the apparatus 200 and may store a default model. The first external memory 250 may be located outside of the apparatus 200 and store a linked model. The second external memory 260 may be located outside of the apparatus 200 and store linked data.

The first generating unit 220 may extract a default model that is associated with user context information. The first generating unit 220 may generate first relation information about a relationship between a concept included in the default model and a concept included in the linked model stored in the first external memory 250 by matching the concept of the default model with the concept of the linked model. For example, the first generating unit 220 may match the concept included in the default model and the concept included in the linked model based on concept relationship information that defines a relationship between concepts. The first generating unit 220 may extract identical concepts from the default model and the linked model by use of, for example, string matching, structure matching, and the like.

The second generating unit 230 may generate second relationship information about a relationship between a concept included in the linked model and a concept included in linked data that is stored in the second external memory 260 by matching the concept of the linked model with the concept of the linked data. For example, the second generating unit 230 may match the concepts included in the linked model and the concepts included in the linked data based on the concept relationship information that defines a relationship between concepts. The second generating unit 230 may extract identical concepts from concepts in the linked model and the linked data by use of, for example, string matching, structure matching, or the like.

The combining unit 240 may combine the default model and the linked model based on the first relationship information. The combining unit 240 may also combine the linked model and the linked data based on the second relationship information.

In the example illustrated in FIG. 2, the apparatus combines the linked model, which is matched with the default model, and the linked data, which is matched with the linked model, with the default model. Accordingly, more variety of concepts may be added to the default model in comparison to a case of simply combining the linked data with the default model. Accordingly, a reasoning device may perform more accurate reasoning based on the extended default model that includes a diversity of concepts.

FIG. 3 illustrates an example of concept relationship information.

Referring to FIG. 3, the concept relationship information may define a relationship between concepts. In the example of FIG. 3, the concept relationship information includes similarity information 310 and hierarchy information 320. However, it should be appreciated that the concept relationship information may include a variety of relationship information, not just what is shown in the example of FIG. 3.

For example, the similarity information 310 may indicate that concept A, concept A', and concept A" are identical. In addition, the similarity information 310 may indicate that concept B, concept W, and concept B" are identical. As another example, the hierarchy information 320 may indicate that concept C is a lower bound concept of concept D and concept E is a lower bound concept of concept F.

Figure 4A:
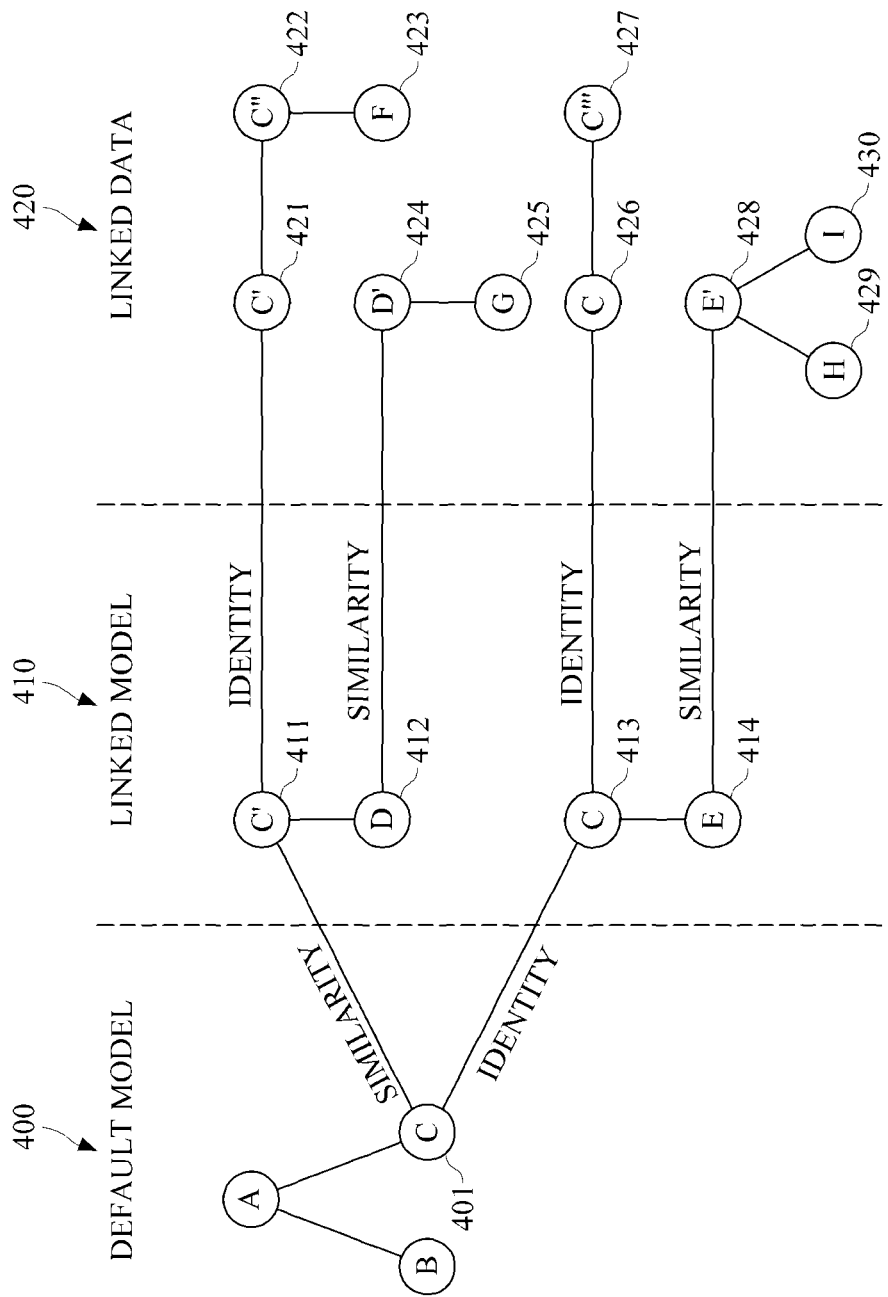
FIGS. 4A and 4B are diagrams illustrating an example of a process of extending a default model by an apparatus for extending a default model.
Figure 4B:
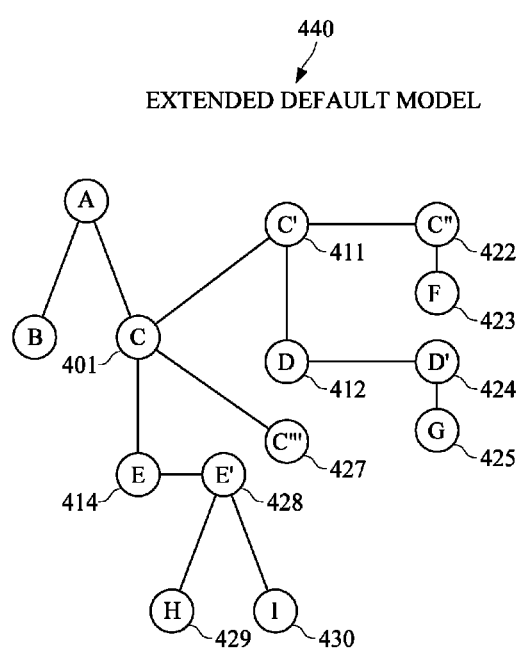

FIGS. 4A and 4B illustrate an example of a process of extending a default model by an apparatus for extending a default model.

Referring to FIG. 4A, the apparatus may extract concept 'C' 401 from a default model associated with user context information.

In this example, the apparatus may match concept 'C' 401 of the default model 400 to each of concepts included in a linked model 410 and generate first relationship information that indicates a relationship between the concept of the default model 400 and each of the concepts included in the linked model 410. For example, the apparatus may match the concepts included in the default model 400 to concepts included in the linked model 410 based on concept relationship information that defines a relationship between the concepts. The apparatus may extract concepts by use of, for example, string matching, structure matching, upper-level ontology-based semantic matching, WordNet-based matching, and the like.

In the example of FIG. 4A, the apparatus may recognize the similarity between concept C 401 of the default model 400 and concept C' 411 of the linked model 410 based on a result of matching, and generate first relationship information that indicates that concept C 401 of the default model 400 is similar to concept C' of the linked model 410. In this example, the apparatus recognizes that concept C' is similar to concept C. In addition, the apparatus may recognize the identity between concept 'C' 401 of the default model 400 and concept 'C' 413 of the linked model 410 based on a result of matching, and generate first relationship information that indicates that concept 'C' 401 of the default model 400 is identical to concept 'C' 413 of the linked model 410. That is, the apparatus may recognize concept C of the default model 400 is also included in the linked model 410.

The apparatus may match concepts 411, 412, 413, and 414 included in the linked model 410 with concepts included in linked data 420, and generate second relationship information about a relationship between each concept of the linked model 410 and each concept of the linked data 420.

For example, the apparatus may recognize the identity between concept C' 411 included in the linked model 410 and concept C' 421 included in the linked data 420 based on a result of matching, and generate relationship information that indicates that concept C' 411 of the linked model 410 is identical to concept C' 421 of the linked data 420.

As another example, the apparatus may recognize the similarity between concept D 412 as a lower concept of concept C' 411 of the linked model 410 and concept D' of the linked data 420 based on a result of matching. In this example, the apparatus may generate relationship information that indicates that concept D of the linked model 410 is similar to concept D' of the linked data 420.

By repeating the above procedure, the apparatus may generate relationship information that indicates that concept C 413 of the linked model 410 is identical to concept C 426 of the linked data 420, and relationship information that indicates that concept E 414 as a lower concept of concept C 413 of the linked model 410 is similar to concept E' 428 of the linked data 420.

Accordingly, the apparatus may combine the default model 400 and the linked model 410 based on the first relationship information, and may combine the linked model 410 and the linked data 420 based on the second relationship information. That is, the apparatus may combine the default mode and the linked data based on the first relationship information and the second relationship information.

Referring to FIG. 4B, the apparatus may combine the default model 400, the linked model 410, and the linked data 420 into an extended default model 440 based on the first relationship information and the second relationship information. The extended default model 440 includes concepts 411, 412, 414, 422, 423, 424, 425, 427, 428, 429, and 430 in addition to the existing concept 401 that is originally included in the default model 400.

The apparatus may combine the linked data with the linked model, and with the default model, thereby adding more variety of concepts to the default model in comparison to a case of simply adding the linked data that is matched with the default model.

Figure 5:
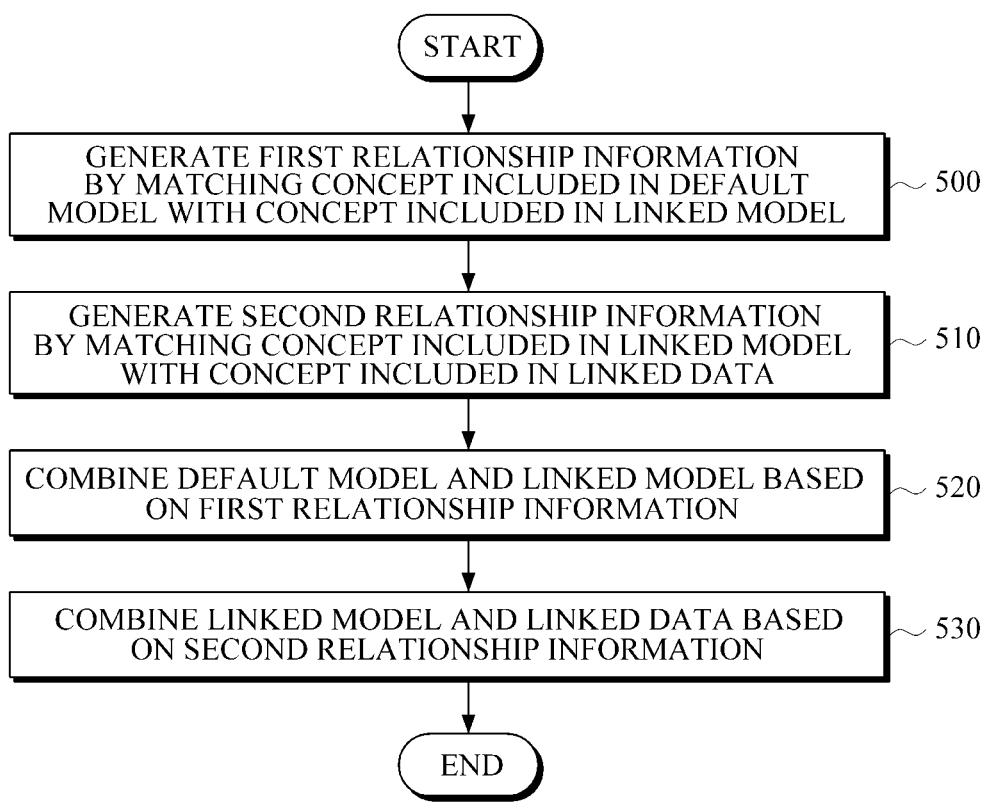
FIG. 5 is a flowchart illustrating an example of a method of extending a default model.

FIG. 5 illustrates an example of a method of extending a default model.

Referring to FIG. 5, first relationship information is generated in 500 by matching a concept included in a default model with a concept included in a linked model. For example, an apparatus may match the concept of the default model with the concept of the linked model based on concept relationship information that defines a relationship between concepts. The apparatus may extract identical concepts from concepts included in the default model and the linked model by use of, for example string matching, structure matching, and the like. The apparatus may generate first relationship information that indicates that the extracted concepts are identical.

Second relationship information is generated in 510 by matching a concept included in the linked model with a concept included in linked data. For example, the apparatus may match the concept of the linked model with the concept of the linked data based on the concept relationship information that defines a relationship between concepts. The apparatus may extract identical concepts from concepts included in the linked model and the linked data by use of string matching, structure matching, and the like. The apparatus may generate the second relationship information that indicates that the extracted concepts are identical.

The default model and the linked model are combined based on the first relationship information, at 520. The linked model and the linked data are combined based on the second relationship information, at 530.

Program instructions to perform a method described herein, or one or more operations thereof, may be recorded, stored, or fixed in one or more computer-readable storage media. The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable laptop PC, a global positioning system (GPS) navigation, a tablet, a sensor, and devices such as a desktop PC, a high definition television (HDTV), an optical disc player, a setup box, a home appliance, and the like that are capable of wireless communication or network communication consistent with that which is disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for extending a default model for user context reasoning, the apparatus comprising:
   a first generating unit configured to generate first relationship information about a relationship between a concept included in the default model and a concept included in a linked model by matching the concept of the default model with the concept of the linked model based on conception relationship information, the conception relationship information comprising at least one of information about identical concepts, information about similar concepts and information about upper and lower concepts;
   a second generating unit configured to generate second relationship information about a relationship between a concept included in the linked model and a concept included in linked data by matching the concept of the linked model with the concept of the linked data; and
   a combining unit configured to combine the default model and the linked model based on the first relationship information, and to combine the linked model and the linked data based on the second relationship information; and
   an internal memory located inside of the apparatus and configured to store the default model.

2. The apparatus of claim 1, wherein the concept relationship information defines a relationship between the concept included in the default model and the concept included in the linked model.

3. The apparatus of claim 1, wherein the second generating unit is configured to match the concept included in the linked model with the concept included in the linked data based on concept relationship information that defines a relationship between concepts.

4. The apparatus of claim 1, wherein the first generating unit is configured to extract identical concepts from concepts included in the default model and the linked model using at least one of string matching, structure matching, upper-level ontology-based semantic matching, and WordNet-based matching, and to generate the first relationship information that indicates that the extracted concepts are identical.

5. The apparatus of claim 1, wherein the second generating unit is configured to extract identical concepts from concepts included in the linked model and the linked data using at least one of string matching, structure matching, upper-level ontology-based semantic matching, and WordNet-based matching, and to generate the second relationship information that indicates that the extracted concepts are identical.

6. The apparatus of claim 1, wherein the first relationship information and the second relationship information include at least one of identity information, similarity information, and hierarchy information.

7. The apparatus of claim 1, further comprising:
a first external memory located outside of the apparatus and configured to store the linked data; and
a second external memory located outside of the apparatus and configured to store the linked data.

8. A method for extending a default model for user context reasoning, the method comprising:
generating first relationship information about a relationship between a concept included in the default model and a concept included in a linked model by matching the concept of the default model with the concept of the linked model based on concept relationship information, the concept relationship information comprising at least one of information about identical concepts, information about similar concepts, and information about upper and lower concepts;
generating second relationship information about a relationship between a concept included in the linked model and a concept included in linked data by matching the concept of the linked model with the concept of the linked data;
combining the default model and the linked model based on the first relationship information; and
combining the linked model and the linked data based on the second relationship information.

9. The method of claim 8, wherein the concept relationship information defines a relationship between concepts.

10. The method of claim 8, wherein the generating of the second relationship information comprises matching the concept included in the linked model with the concept included in the linked data based on concept relationship information that defines a relationship between concepts.

11. The method of claim 8, wherein the generating of the first relationship information comprises
extracting identical concepts from concepts included in the default model and the linked model using at least one of string matching, structure matching, upper-level ontology-based semantic matching, and WordNet-based matching, and
generating the first relationship information that indicates that the extracted concepts are identical.

12. The method of claim 8, wherein the generating of the second relationship information comprises
extracting identical concepts from concepts included in the linked model and the linked data using at least one of string matching, structure matching, upper-level ontology-based semantic matching, and WordNet-based matching, and
generating the second relationship information that indicates that the extracted concepts are identical.

13. The method of claim 8, wherein the first relationship information and the second relationship information include at least one of identity information, similarity information, and hierarchy information.

14. A non-transitory computer-readable storage medium having stored therein program instructions to cause a processor to execute a method for extending a default model associated with user context, the method comprising:
generating first relationship information about a relationship between a concept included in the default model and a concept included in a linked model by matching the concept of the default model with the concept of the linked model based on concept relationship information, the concept relationship information comprising at least one of information about identical concepts, information about similar concepts, and information about upper and lower concepts;
generating second relationship information about a relationship between a concept included in the linked model and a concept included in linked data by matching the concept of the linked model with the concept of the linked data;
combining the default model and the linked model based on the first relationship information; and
combining the linked model and the linked data based on the second relationship information.

15. An apparatus for extending a model used for context reasoning, the apparatus comprising:
a generating unit configured to generate relationship information about a relationship between one or more concepts included in the model and one or more concepts included in a linked model by matching the one or more concepts of the model with the one or more concepts of the linked model based on concept relationship information, the concept relationship information comprising at least one of information about identical concepts, information about similar concepts, and information about upper and lower concepts;
a combining unit configured to extend the model by combining the model and the linked model based on the relationship information; and
an internal memory located inside of the apparatus and configured to store the model.

16. The apparatus of claim 15, wherein the generating unit is configured to identify a concept included in the model that is identical to a concept included in the linked model based on the matching, and to generate relationship information indicating the concept included in the model is identical to the concept included in the linked model.

17. The apparatus of claim 15, wherein the generating unit is configured to identify a concept included in the model that is similar but not identical to a concept included in the linked model based on the matching, and to generate relationship information indicating the concept included in the model is similar to the concept included in the linked model.

18. The apparatus of claim 15, further comprising a second generating unit configured to generate second relationship information about a relationship between one or more concepts included in the linked model and one or more concepts included in linked data by matching the one or more concepts of the linked model with the one or more concepts of the linked data,
wherein the combining unit is further configured to extend the model by combining the model and the linked data based on the relationship information and the second relationship information.

* * * * *